ated with one hand, easily operated to open the mouth of a fish, hold the fish while removing a hook, and carry the fish, all without touching the fish thereby avoiding being bitten, finned or soiled. The device comprises an L-shaped body the short side forming a portion of a pistol grip and with a piercing point extending generally perpendicularly from the long side of the body. An arm is pivotally secured to the body having a second piercing point extending therefrom and is actuated by a pistol grip handle pivotably secured to the end of the body's short side and connected to the arm by an actuating shaft. A ratchet mechanism is provided on the handle coacting with the free end of the handle for extending and holding the points in a set position with a ratchet releasing means on the handle for deactuating the apparatus with a single hand. The arm includes a plurality of pivot connections for selectively changing the stroke of the points. The handle has first and second spaced portions on opposite sides of the body for providing a sturdy yet light weight device with plastic guide members between the handle and the body for preventing rust and corrosion.

United States Patent

Wolfe

[11] 3,707,800
[45] Jan. 2, 1973

[54] FISH MOUTH SPREADER AND HOLDER

[76] Inventor: Charles S. Wolfe, 2316 Norman, Pasadena, Tex. 77502

[22] Filed: Sept. 2, 1971

[21] Appl. No.: 177,250

[52] U.S. Cl. .................................................. 43/53.5
[51] Int. Cl. ............................................. A01k 97/00
[58] Field of Search ..................................... 43/53.5

[56] References Cited

UNITED STATES PATENTS

| | | | |
|---|---|---|---|
| 1,952,990 | 3/1934 | Kirsch | 43/53.5 |
| 2,481,007 | 9/1949 | Dugdale | 43/53.5 |
| 2,807,495 | 9/1957 | Pillstrom | 43/53.5 X |
| 3,514,892 | 6/1970 | Wormsbecker | 43/53.5 |

*Primary Examiner*—Louis G. Mancene
*Assistant Examiner*—Daniel J. Leach
*Attorney*—James F. Weiler et al.

[57] ABSTRACT

A fish mouth spreader and holder which can be held

6 Claims, 7 Drawing Figures

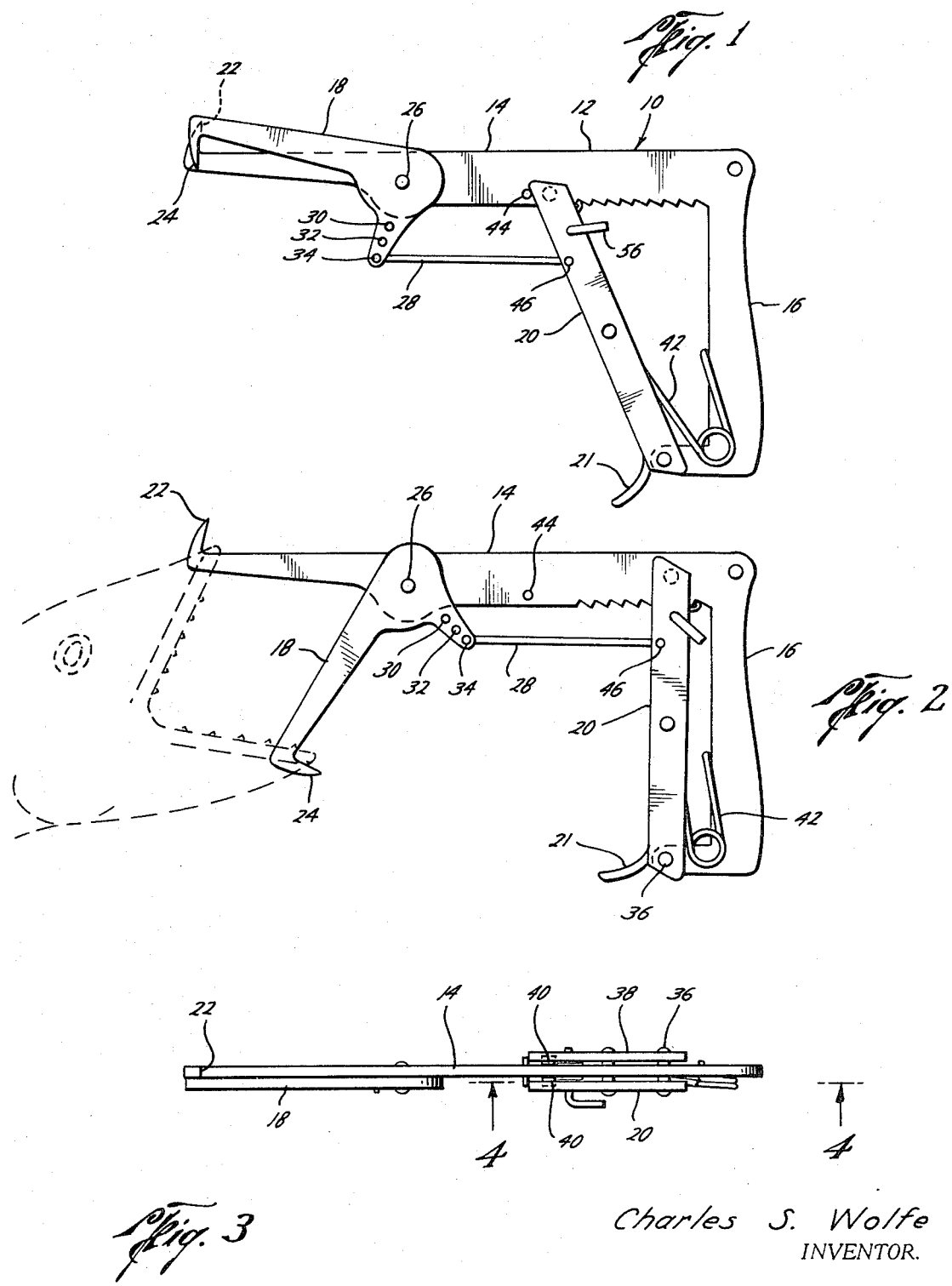

PATENTED JAN 2 1973

Charles S. Wolfe
INVENTOR.

BY James L. Weeks
William L. Stout

ATTORNEYS

FISH MOUTH SPREADER AND HOLDER

BACKGROUND OF THE INVENTION

The use of scissor like devices for spreading the mouth of a fish is generally old. However, such prior art devices have proved to be difficult, complicated to operate and have proved to be ineffective.

The present invention is directed to an improved fish mouth spreader and holder which in its retracted position may enter the mouth of the fish with ease and may be actuated with a single hand to open, and hold the mouth of the fish in a secured open position enabling the fisherman to remove the hook or lure while reducing the danger of being bitten, finned, or soiled, and will securely hold the fish for carrying to a place of storage, and thereafter may be released all without touching the fish.

SUMMARY

The present invention is directed to a fish mouth spreader and holder having an L-shaped body, the short side forming a portion of a pistol grip for ease of handling with a first piercing point extending generally perpendicular from the long side of the body with an arm pivotally secured to the body and including a second piercing point. A pivoting handle is connected to the body for forming the remainder of the pistol grip thereby providing a single handed holder and actuator. The handle is connected to and actuates the arm around a pivoting fulcrum point for providing a powerful yet easily actuated device.

Teeth are provided on the body with ratchet engaging means on the pivoting handle for securely holding the device in a secured open position with a releasing mechanism on the pivoting handle for releasing the ratchet engaging means by thumb action whereby the present device may be actuated and released with a single hand allowing the other hand to be freed for other operations.

Spring means are provided yieldably acting against the pivoting handle with a stop on the body for limiting the movement of the pivoting handle for holding the piercing points in an overlapped retracted position for ease of insertion into the mouth of the fish and for protection from injury to user when not in use.

Another object of the present invention is to provide a plurality of pivot connections in the fulcrum arm for attachment to an actuating shaft for changing the stroke of the piercing points depending upon the size of the fish being caught.

Still a further object is the provision of an inexpensive but sturdy device in which the handle includes two spaced portions the first ends of which pivotally engage the body on opposite sides. The second ends of said portions slidably engage the body and the ratchet engaging and releasing means is supported between the spaced portions of the handle. Plastic guide means may be provided between the second ends of the handle and the body for preventing removal of protective finishing thereby limiting corrosion and rust.

It is therefore an object of the present invention to provide a fish mouth spreader which will easily enter the mouth of the fish in a retracted position and can be actuated by a pistol grip to spread the mouth of the fish to a fully opened position and secured there without further actuation pressure, and in which piercing points will securely hold the fish's mouth open without slippage to enable the fisherman to remove a hook, string the fish and thereafter transport the fish to storage, all without requiring touching of the fish.

BRIEF DESCRIPTION OF THE DRAWINGS

FIG. 1 is an elevational view of the apparatus of the present invention shown in a retracted position, FIG. 2 is an elevational view of the present invention showing the present invention in its actuated position, FIG. 3 is a top view of the apparatus of FIGS. 1 and 2.

DESCRIPTION OF THE PREFERRED EMBODIMENT

Figure 4:
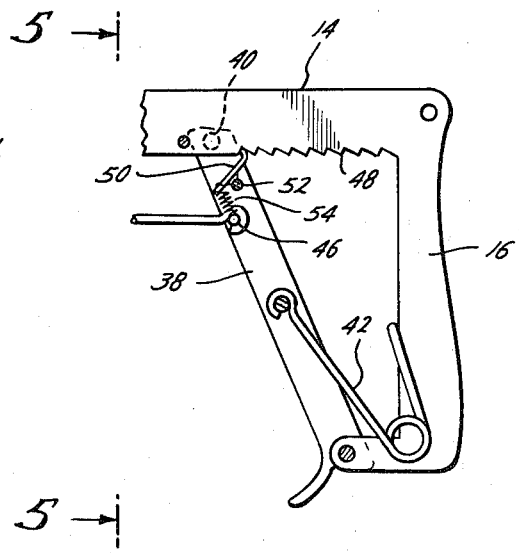
FIG. 4 is a cross-sectional view taken along the line 4—4 of FIG. 3.
Figure 5:
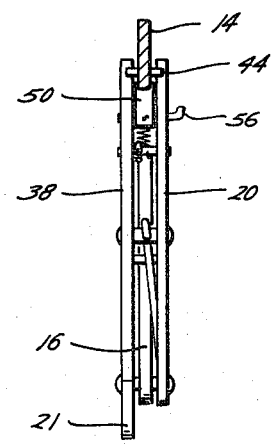
FIG. 5 is a cross-sectional view taken along the line 5—5 of FIG. 4.
Figure 6:
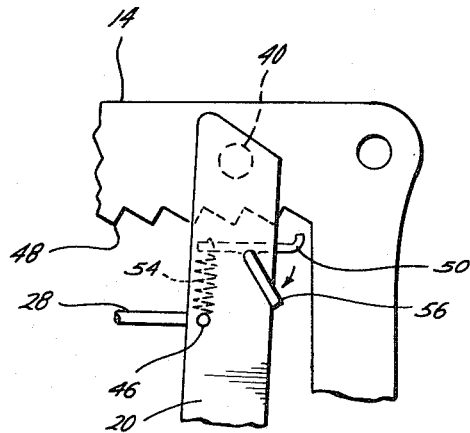
FIG. 6 is a fragmentary elevational view showing the releasing mechanism releasing the ratchet engaging mechanism.
Figure 7:
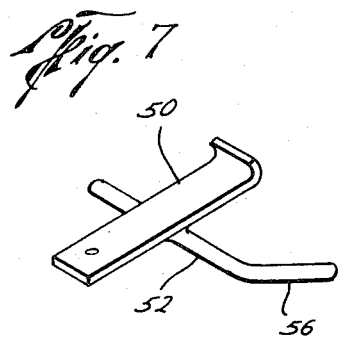
FIG. 7 is an enlarged perspective view of part of the ratchet engaging and releasing mechanism of the present invention.

Referring now to the drawings, and particularly to FIGS. 1–3, the reference numeral 10 generally represents the fish mouth spreader and holder of the present invention and includes an L-shaped body 12, an arm 18 pivotally connected to the body 12 and an actuating handle 20.

The L-shaped body 12 includes a long side 14 and a short side 16. The short side 16 forms a portion of a pistol grip for ease of holding and actuation as will be more fully described hereinafter. A piercing point 22 extends generally perpendicular from the long side 14 and a second piercing point 24 extends from the outer end of the arm 18. The arm 18 is secured to the body 12 by a pivot point 26 to provide a fulcrum pivot point for moving the piercing points 22 and 24 into an overlap or retracted position (FIG. 1) for insertion into the mouth of a fish and for extension for engaging and piercing the inside of the mouth of a fish (FIG. 2) for opening the mouth, holding the fish in order to remove the hook from the mouth of the fish, inserting a stringer thereby safely holding controlling, dehooking, stringing and storing a fish, all without being bitten, finned or soiled. It is to be noted that the points 22 and 24 when actuated, as best seen in FIG. 2, move outwardly and securely engage and hold a fish thereby insuring that the fish will remain secured and not lost.

The arm 18 is actuated and controlled by an actuating shaft 28 which is pivotally secured to the arm through one of the pivot holes 30, 32 or 34. The desired pivot hole 30, 32 or 34 may be selectively chosen to change the stroke of movement of the piercing points 22 and 24 depending upon the size of the fish desired to be handled. The actuating shaft 28 is in turn connected by pivot 46 to and controlled by the pivoting handle 20. The handle 20 is pivotally connected to the short side 16 of the body 12 at pivot 36 to form with the first side 16 a pistol like grip for both holding and actuating the apparatus 10. In order to provide stability and strength it is preferable that the pivoting handle 20 include first and second spaced portions 38 and 40, as best seen in FIG. 3, for engaging opposite sides of the body 12 wherein the first ends are connected to the pivot 36 and the second ends slide along opposite sides of the long body side 14. However, in order to avoid removing the protective finish of the parts, which is preferably anodized, a plastic guide member such as discs 40 (FIGS. 3–6) are provided between the body 14 and the handle portions 38 and 40 to protect the finish and avoid corrosion. The handle 20 may include guard 21 for preventing slippage of the hand off the handle 20.

A spring 42 is provided acting between side 16 and the handle 20 for yieldably urging the handle outwardly and moving the arm 18 into a retracted position. As best seen in FIG. 1, a stop 44 is provided for engaging the handle 20 and limiting the movement of the handle 20 by action of the spring 44 whereby the piercing points 22 and 24 are placed in a retracted and overlapping position shielding the points 22 and 24 for ease of insertion into the mouth of a fish, and for protection from injury to user when not in use.

The portions 38 and 40 of the pivoting handle 20 provide the durability and stability for the holding and releasing components. Thus, the actuating shaft 28 is pivotally connected at pivot 46 to handle portions 38 and 40. Ratchet teeth 48 are provided on the underside of the long side 14 of the body 12 and positioned between the handle portions 38 and 40. A spring loaded ratchet engaging means may include a ratchet lock 50 which is pivotally supported between handle portions 38 and 40 on a pivot 52 and adapted to engage the ratchet teeth 48. A spring 54 allows the ratchet lock 50 to ratchet past the teeth 48 as the handle 20 is squeezed. Thus the lock 50 when engaging the teeth holds the handle 20 and thus the arm 18 in a secured position. As best seen in FIGS. 4, 5, 6 and 7, the ratchet lock 50 is connected to a releasing lever 56 through the pivot pin 52. While the ratchet lock 50 is normally held in a locked position, as shown in FIG. 4 by the spring 54, movement of the lever 56, such as by thumb action, pivots the lock 50 downwardly out of engagement with the ratchet teeth 48 allowing spring 42 to retract arm 18.

Thus, it is noted that the present apparatus is operable by one hand in that the pistol grip formed by the short side 16 and the handle 20 provides a structure for not only holding the apparatus 10 and a fish but for actuation of the handle 20 for opening the fish's mouth and securing the fish on the piercing points 22 and 24. In addition, the same hand may be used to actuate the releasing lever 56 by thumb action to retract the piercing points 22 and 24 into an overlapped and non-engaging position, thereby leaving the operator's other hand free.

In use, the apparatus 10 may be used simply and easily by actuating the releasing lever 56 and allowing the spring 42 to place the handle 20 against the stop pin 44 thereby placing the arm 14 in the retracted position to place the piercing points 22 and 24 in an overlapped position as best seen in FIG. 1. Thus in the retracted position, the points 22 and 24 may be inserted into the fish's mouth while holding the fish line in the other hand and the handle 20 actuated to retract the arm 18 and move the points 22 and 24 outwardly into the fish's mouth to open the mouth and securely pierce and hold and support the fish solely by the apparatus 10. The second hand may be then used to remove the hook from the fish such as by pliers and placed on a stringer if desired or into a suitable storage box while fully supporting the fish from the apparatus 10. At no time need the fisherman touch the fish with either hand and thereby the fisherman can avoid being bitten, finned or soiled.

The present invention is, therefore, well adapted to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. A fish mouth spreader and holder comprising,
    an L-shaped body, the short side forming a portion of a pistol grip,
    a piercing point extending generally perpendicularly from the long side of the body,
    an arm pivotally secured to the body and including a second piercing point extending generally perpendicularly from the arm.
    an actuating shaft connected to the arm for moving the arm about the pivot,
    a pivoting handle connected to the body forming the remainder of the pistol grip, and connected to the actuating shaft,
    spring means yieldably acting against the pivoting handle in a direction for moving the piercing points to a retracted position,
    a stop on the body for engaging and limiting the measurement of the pivoting handle by the spring for holding the piercing points in an overlapped retracted position,
    ratchet teeth on the body,
    spring loaded ratchet engaging means on the pivoting handle for engaging the ratchet teeth as the handle is squeezed, and
    releasing means on the pivoting handle for releasing the ratchet engaging means.

2. The apparatus of claim 1 including,
    said arm including a plurality of pivot connections for selective attachment to the actuating shaft for changing the stroke of said piercing points.

3. The apparatus of claim 1 wherein said pivoting handle includes,
    first and second spaced portions, the first ends of which pivotally engage and are positioned on opposite sides of the short side of the body, and the second ends of which are positioned on opposite sides of the long side of the body.

4. The apparatus of claim 3 including,
    plastic guide members between the second ends of the pivoting handle and the long side of the body.

5. A fish mouth spreader comprising,
    an L-shaped body, the short side forming a portion of a piston grip,
    a piercing point extending generally perpendicularly from the long side of the body,
    an arm pivotally secured to the body and including a second piercing point extending generally perpendicularly from the arm, an actuating shaft connected to the arm for moving the arm about the pivot, a pivoting handle connected to the body forming the remainder of the piston grip and connected to the actuating shaft, said handle including first and second spaced portions, the first ends of which pivotally engage the short side of the body on opposite sides thereof, and the second ends of which are positioned on opposite sides of the long side of the body with a plastic guide member between each second end of the handle and the body, spring means yieldably acting against the pivoting handle in a direction for moving the piercing points to a retracted position, a stop on the body for engaging the pivoting handle limiting moving of the handle by the spring for holding the piercing points in an overlapped retracted position, ratchet teeth on the body, spring loaded ratchet engaging means between the spaced portions of the pivoting handle for engagement with the ratchet teeth as the handle is squeezed, and releasing means on the handle connected to the ratchet engaging means for releasing the ratchet engaging means from the teeth by thumb action.

6. The apparatus of claim 5 wherein, the ratchet teeth on the body are positioned between the first and second spaced handle portions, and the ratchet engaging means is carried by the handle between the spaced handle portions.

* * * * *